US010273376B2

(12) United States Patent
Parazak et al.

(10) Patent No.: US 10,273,376 B2
(45) Date of Patent: Apr. 30, 2019

(54) INK COMPOSITION AND PRE-TREATMENT FIXING FLUID

(71) Applicant: Hewlett-Packard Development Company, L.P., Houston, TX (US)

(72) Inventors: Dennis P. Parazak, Oceanside, CA (US); Gregg A. Lane, San Diego, CA (US); Fereshteh Khorrami, San Diego, CA (US); Dennis Z. Guo, San Diego, CA (US); Benjamin Abelovski, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 15/322,938

(22) PCT Filed: Jul. 30, 2014

(86) PCT No.: PCT/US2014/048891
§ 371 (c)(1),
(2) Date: Dec. 29, 2016

(87) PCT Pub. No.: WO2016/018306
PCT Pub. Date: Feb. 4, 2016

(65) Prior Publication Data
US 2017/0145238 A1 May 25, 2017

(51) Int. Cl.
B41J 2/01 (2006.01)
C09D 11/54 (2014.01)
C09D 11/101 (2014.01)
C09D 11/102 (2014.01)
C09D 11/38 (2014.01)
(Continued)

(52) U.S. Cl.
CPC .................. C09D 11/54 (2013.01); B41J 2/01 (2013.01); C09D 11/101 (2013.01); C09D 11/102 (2013.01); C09D 11/322 (2013.01); C09D 11/38 (2013.01); C09D 11/40 (2013.01)

(58) Field of Classification Search
None
See application file for complete search history.

(56) References Cited

U.S. PATENT DOCUMENTS 6,833,395 B2   12/2004   Rygas et al.
8,304,479 B2   11/2012   Zong et al.
8,580,883 B2   11/2013   Zong et al.
(Continued)

FOREIGN PATENT DOCUMENTS

EP   1252243   2/2006
EP   2660066   11/2013

OTHER PUBLICATIONS

"Comprising Packaging Ink Raw Materials Applied to the Non-food Contact Surface of Food Packaging", EuPIA a sector of CEPE aisbl, Inventory List Dec. 2013, 153 pgs.
(Continued)

Primary Examiner — Erica S Lin
(74) Attorney, Agent, or Firm — Dierker & Kavanaugh PC

(57) ABSTRACT

An example of an ink composition includes a pigment, an anionic polymeric dispersant, polyurethane, a co-solvent, a surfactant, tristyrylphenol ethoxylate, and a balance of water. The tristyrylphenol ethoxylate is present in an amount ranging from about 0.1 wt % to about 2 wt % of a total wt % of the ink composition.

19 Claims, 3 Drawing Sheets

(51) Int. Cl.
    *C09D 11/40* (2014.01)
    *C09D 11/322* (2014.01)

(56) References Cited

U.S. PATENT DOCUMENTS

| | | | | |
|---|---|---|---|---|
| 2005/0256262 A1* | 11/2005 | Hill | ................ | C09D 7/70 |
| | | | | 524/702 |
| 2007/0035594 A1* | 2/2007 | Brooks | ................ | B41J 2/175 |
| | | | | 347/85 |
| 2007/0219290 A1* | 9/2007 | Sarkisian | ................ | C09D 11/30 |
| | | | | 523/160 |
| 2007/0292692 A1 | 12/2007 | Yue et al. | | |
| 2010/0033523 A1* | 2/2010 | Suzuki | ................ | B41J 2/1752 |
| | | | | 347/9 |
| 2012/0019588 A1* | 1/2012 | Mubarekyan | ................ | C09D 11/30 |
| | | | | 347/20 |
| 2013/0076842 A1 | 3/2013 | Sarkisian | | |
| 2014/0037913 A1* | 2/2014 | Nagahama | ................ | B41J 2/01 |
| | | | | 428/195.1 |

OTHER PUBLICATIONS

International Search Report and Written Opinion for International Application No. PCT/US2014/048891 dated Jun. 16, 2015, 15 pages.
"Soprophor S/25" Rhodia Solvay Group Brazil, 2013, 1 pg.

\* cited by examiner

INK COMPOSITION AND PRE-TREATMENT FIXING FLUID

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Figure 1:
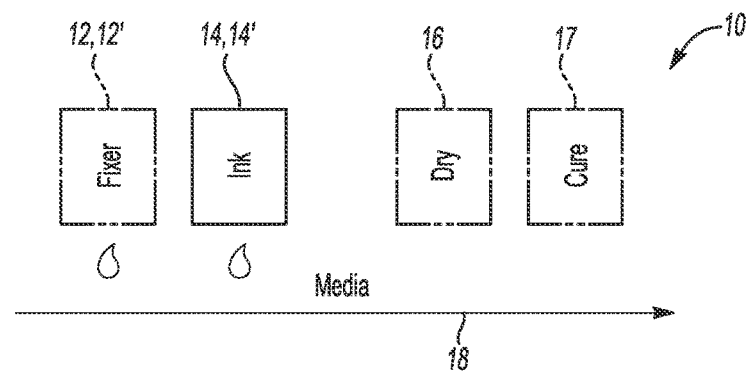
FIG. 1 is a flow diagram illustrating examples of a printing method using an example of an ink set and/or an example of a pre-treatment fixing fluid disclosed herein.

In inkjet printing, aqueous based inks are commonly used on uncoated media, in part because the high surface energy of the aqueous ink enables the ink to spread well on the uncoated media. Aqueous inks may also be desirable for printing on coated offset media, which is a slow-absorbing media with high hold-out (i.e., colorants tend to remain on the surface of the media). However, coated offset media has a relatively low surface energy, and the higher surface energy aqueous inks do not spread well. As a result, images formed from aqueous inks on coated offset media tend to have reduced image quality attributes, such as, for example, gloss or optical density.

In theory, pre-treatment compositions may render coated offset media more suitable for printing with aqueous based inks. Pre-treatment compositions are often substantially colorless liquids that interact with the colorant and/or with polymeric components of the ink composition in order to precipitate (i.e., crash) the colorants or otherwise fix the ink composition to the print media surface. Pre-treatment fixing fluid compositions have been applied on the coated offset media before the application of an ink composition in view of improving printing characteristics and attributes of the image. Some pre-treatment fixing fluid compositions have been applied to coated offset media and dried prior to subsequent ink application. This forms a dried ink-receiving type of layer on the surface of the medium. While this desirably controls bleed, the gloss of the resulting print often suffers.

For high speed inkjet printing, wet-on-wet printing (i.e., wet ink deposited on wet pre-treatment fixing fluid) may be desirable, for example, so that in-line printing can be performed. Wet-on-wet printing could also enable the use of commercially available coated offset media which does not include any pre-treatment fixing fluid composition thereon, and thus may otherwise be undesirable for high speed inkjet printing. The chemistry involved in wet-on-wet printing is complex, due in part to the interaction between the media and the pre-treatment fixing fluid composition, and between the pre-treatment fixing fluid composition and the ink(s). In addition, for wet-on-wet printing, the slow-absorbing nature of coated offset media requires the pre-treatment fixing fluid composition to be highly (i.e., immediately) reactive with subsequently deposited inks in order to control bleed and pigment floatation (i.e., dot gain). The desired reactivity may be accomplished by increasing the organic acid salt content; however, it has been found that a higher salt content can lead to pen reliability issues resulting from corrosion, and to the formation of prints with poor durability.

The present inventors have discovered an aqueous ink suitable for printing on coated offset media, and also a pre-treatment fixing fluid that is suitable for wet-on-wet printing on coated offset media. In the examples disclosed herein, the ink composition and the pre-treatment fixing fluid are formulated with tristyrylphenol ethoxylate. Tristyrylphenol ethoxylate is a surfactant-like molecule that is capable of interfacing with the colorant of an ink composition. The tristyrylphenol ethoxylate includes a hydrophobic portion that interacts with the colorant surface and a hydrophilic portion that is water soluble. The tristyrylphenol ethoxylate may also be capable of interfacing or interacting with polymeric dispersants in the ink composition as well.

When incorporated into the ink composition or the pre-treatment fixing fluid, the surfactant-like properties of the tristyrylphenol ethoxylate can contribute to better wetting of the ink or the pre-treatment fixing fluid on the coated offset media, leading to improved dot gain, gloss, and optical density. These attributes may be observed whether or not the ink is a UV ink that is cured. Although curing may further improve durability of the resulting print. Also when incorporated into the ink composition, the tristyrylphenol ethoxylate can shield the colorant in the ink composition from salt(s) in a pre-treatment fixing fluid that is used in combination with the ink composition. Also when incorporated into pre-treatment fixing fluid, the tristyrylphenol ethoxylate can shield the colorant in a subsequently deposited ink composition from salt(s) in the pre-treatment fixing fluid. Shielding the colorant from the salt results in a softer crashing of the colorant during the application of the ink onto the medium. This promotes dot gain, resulting in a more uniform, smooth print with higher quality print attributes, such as, less white space, increased gloss, and increased optical density. These print improvements are exhibited on a variety of media types, including non-specialty offset media.

Furthermore, the ink composition with tristyrylphenol ethoxylate and/or the pre-treatment fixing fluid with tristyrylphenol ethoxylate may be printed onto the coated offset media without any preparation of the media before the printing method begins, thereby reducing the steps of the printing method.

Referring now to FIG. 1, multiple examples of a printing method 10 are shown. One example of the method 10 may utilize a single cartridge ink set, which includes the ink composition 14 disclosed herein. Another example of the method 10 may utilize a multiple-cartridge ink set, which includes the pre-treatment fixing fluid 12 disclosed herein and the ink composition 14 disclosed herein and/or another ink composition 14' (which does not include tristyrylphenol ethoxylate). Still another example of the method 10 may utilize another example of the multiple-cartridge ink set, which includes a pre-treatment fixing fluid 12' (without tristyrylphenol ethoxylate) and the ink composition 14 disclosed herein, with or without the other ink composition 14'. The various examples of the method 10 will be described further hereinbelow.

In one example, the ink composition 14 disclosed herein includes a pigment, an anionic polymeric dispersant, a co-solvent, a surfactant, tristyrylphenol ethoxylate, and a balance of water. In some examples, the ink composition 14 consists of these components, with no other components. In another example, the ink composition 14 disclosed herein includes a pigment, an anionic polymeric dispersant, a polyurethane, a co-solvent, a surfactant, tristyrylphenol ethoxylate, and a balance of water. In yet another example, the ink composition 14 consists of these components, with no other components. The ink composition 14 is used for image creation.

As used herein, "ink vehicle" may refer to the liquid fluid in which colorant (e.g., a colorant dispersion) and, in some instances, polyurethane (e.g., a polyurethane dispersion) are placed to form the ink(s) 14. A wide variety of ink vehicles may be used with the ink sets and methods of the present disclosure. The ink vehicle may include water alone or in combination with a mixture of a variety of different agents. Examples of these agents may include, but are limited to, co-solvents, surfactants, antimicrobial agents, anti-kogation agents, viscosity modifiers, materials for pH adjustment, sequestering agents, preservatives, jettability additives (e.g., liponic ethylene glycol (LEG-1), available from Liponics), and the like.

The ink vehicle may include a co-solvent present in total in the ink(s) 14 in an amount ranging from about 0.1 wt % to about 30 wt %, depending, at least in part, on the jetting architecture. In an example, the co-solvent in present in the ink(s) 14 in an amount of about 10 wt % based on the total wt % of the ink(s) 14. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle may also include surfactant(s) and/or antimicrobial agent(s). As an example, the ink composition 14 may include non-ionic, cationic, and/or anionic surfactants, which may be present in an amount ranging from about 0.01 wt % to about 5 wt % based on the total wt % of the ink composition 14. In at least some examples, the ink vehicle may include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the ink composition 14 may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink composition 14. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. The anti-kogation agent may be present in the ink composition 14 in an amount ranging from about 0.1 wt % to about 2 wt % of the total wt % of the ink(s) 14, 14'.

The ink composition 14 may be any color, such as black, cyan, magenta, yellow, etc. As such, in addition to the ink vehicle, the ink composition 14 also includes a colorant. In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. In still another example, the pigment dispersion may also include the tristyrylphenol ethoxylate. The pigment dispersion may be prepared or purchased, and the other components of the ink (e.g., vehicle components, with or without polyurethane) may be slowly added to the pigment dispersion with continuous mixing, to form the ink composition 14.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J. (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The total amount of pigment in the ink composition 14 ranges from about 1 wt % to about 5 wt % (based on the total wt % of the ink composition 14). The average particle size of the pigments may range anywhere from about 80 nm to about 150 nm.

In the examples disclosed herein, the pigment is dispersed by the anionic polymer (i.e., anionic polymeric dispersant). The dispersant may be present in an amount ranging from about 0.1 wt % to about 5 wt % of a total wt % of the ink composition 14.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble. As such, no latex polymer is present in the ink composition 14.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

In addition, in some instances, the ink composition 14 may also include the polyurethane. In an example, the polyurethane is present in an anionic polyurethane dispersion including water and the polyurethane. The anionic polyurethane dispersion may be added to the other components of the ink vehicle to improve durability of the resulting print, along with the colorant, to form the ink composition 14. In addition, the polyurethane may be an ultraviolet (UV) curable polyurethane.

The anionic polyurethane dispersion may be formed by first synthesizing a polyurethane solution (i.e., the polyurethane polymer in an organic solvent), and then ionizing and dispersing the polyurethane solution in water to form the anionic polyurethane dispersion. The resulting anionic polyurethane dispersion includes the anionic polyurethane polymer, which is water soluble/dispersible. Each of these steps will be discussed further below.

The composition of the anionic polyurethane polymer includes the following components: (a) a polyisocyanate, (b) a polyol having a number average molecular weight ($M_n$) from about 500 to about 6,000, and (c) a compound containing an ionic group or a group capable of forming an ionic group; and, in some instances: (d) a polyol having a polyethyleneoxide functional group, and/or (e) a diol or triol having a number average molecular weight ($M_n$) ranging from about 62 to about 500. In an example, the anionic polyurethane polymer may have a weight average molecular weight ($M_w$) ranging from about 5,000 to about 70,000.

The amount of component (a) within the anionic polyurethane dispersion ranges from about 20 wt % to about 60 wt % based upon the total resin amount in the dispersion. In an example, component (a) ranges from about 30 wt % to about 50 wt %.

Component (a) may be any polyisocyanate typically used in polyurethane chemistry. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (a) may be an aliphatic, cycloaliphatic, araliphatic, or aromatic polyisocyanate, as well as products of their oligomerization, used alone or in mixtures of two or more.

Some specific examples of suitable aliphatic polyisocyanates include alpha, omega-alkylene diisocyanates having from 5 to 20 carbon atoms, such as hexamethylene-1,6-diiso-cyanate, 1,12-dodecane diisocyanate, 2,2,4-trimethylhexamethylene diisocyanate, 2,4,4-trimethyl-hexamethylene diisocyanate, 2-methyl-1,5-pentamethylene diisocyanate, or the like. Polyisocyanates having fewer than 5 carbon atoms can also be used, but may be less desirable because of their relatively high volatility. In an example, the aliphatic polyisocyanate is selected from isophorone diisocyanate (IPDI), 2,2,4-trimethyl-hexamethylene-diisocyanate (TDMI), 2,4,4-trimethyl-hexamethylene diisocyanate, and hexamethylene diisocyanate (HDI).

Some specific examples of suitable cycloaliphatic polyisocyanates include dicyclohexylmethane diisocyanate (commercially available as DESMODUR™ W from Bayer Corp., isophorone diisocyanate, 1,4-cyclohexane diisocyanate, 1,3-bis-(isocyanatomethyl)cyclohexane, or the like. In an example, the cycloaliphatic polyisocyanate is selected from dicyclohexylmethane diisocyanate and isophorone diisocyanate.

Some specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, or the like. In an example, tetramethyl xylylene diisocyanate is selected.

Examples of suitable aromatic polyisocyanates include 4,4'-diphenylmethylene diisocyanate, toluene diisocyanate and its isomers, naphthalene diisocyanate and its oligomeric forms, or the like. In an example, toluene diisocyanate is selected.

The amount of component (b) within the anionic polyurethane dispersion ranges from about 10 wt % to about 50 wt % based upon the total resin amount in the dispersion. In an example, component (b) ranges from about 15 wt % to about 40 wt %.

Component (b) is a polyol. The term "polyol", as used herein, means any product having an average of about 2 or more hydroxyl groups per molecule. Examples of suitable polyols for component (b) have a number average molecular weight of at least 500. As examples, component (b) may have a number average molecular weight ranging from about 1,000 to about 10,000, or from about 1,000 to about 6,000 may be used. As other examples, component (b) may have a number average molecular weight ranging from about 500 to about 6,000. In any of these examples, component (b) is a macro-glycol. Examples of suitable macro-glycols include polyester polyols (e.g., alkyds), polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or the like, or mixtures thereof.

The amount of component (c) within the anionic polyurethane dispersion ranges from greater than 0 wt % to about 10 wt % based upon the total resin amount in the dispersion. In an example, component (c) ranges from about 2 wt % to about 5 wt %.

Component (c) is a low molecular weight compound which contains ionic group(s) or some group that is capable of forming an ionic group. Component (c) is desirable so that the polyurethane can be dissolved or dispersed in water after ionization with a base. Examples of component (c) may be derived from hydroxy-carboxylic acids having the general formula $(HO)_xQ(COOH)_y$, where Q is a straight or branched hydrocarbon radical containing 1 to 12 carbon atoms, and x and y each independently range from 1 to 3. Examples of suitable hydroxy-carboxylic acids include dimethylolpropionic acid (DMPA), dimethylol butanoic acid (DMBA), citric acid, tartaric acid, glycolic acid, lactic acid, malic acid, dihydroxymaleic acid, dihydroxytartaric acid, or the like, or mixtures thereof. Hydroxyls or amines containing a sulfonate functional group can also be used as component (c). Examples include taurine and aminopropylaminoethylsulfonate. Hydroxyls or amines containing a phosphate functional group can also be used as component (c). An example includes glycerol phosphate disodium dehydrate.

As noted above, component (d) may or may not be included. When included, the amount of component (d) within the anionic polyurethane dispersion ranges from greater than 0 wt % to about 10 wt % based upon the total resin amount in the dispersion. In an example, component (d) ranges from about 2 wt % to about 8 wt %.

Component (d) is a polyol having a polyethyleneoxide functional group. In an example, component (d) also has a water solubility of >10% w/w. For component (d), the OH functionality ranges from at least 1.8 to 3, or in some examples from 1.9 to 2.2. The number average molecular weight ranges from about 500 to 2,000. An example of component (d) includes YMER™ N-120 (Perstop Chemical Company).

As noted above, component (e) may or may not be included. When included, the amount of component (e) within the anionic polyurethane dispersion ranges from 1 wt % to about 10 wt % based upon the total resin amount in the dispersion. In an example, component (d) ranges from about 5 wt % to about 10 wt %.

Component (e) is a lower molecular weight diol or triol with a number average molecular weight ($M_n$) ranging from about 62 to about 500. In an example, component (e) has a number average molecular weight ($M_n$) ranging from about 62 to about 400 with the average number of functional groups ranging from 2 to 5. The diols are bifunctional alcohols which are typically used in polyurethane chemistry to control the hard segment and molecular weight. In some instances, they are referred to as chain extenders. Examples of component (e) include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentyl glycol, cyclohexanel-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethylene glycol, triethylene glycol, tetraethylene glycol, dipropylene glycol, tripropylene glycol, N-substituted ethanolamines, and mixtures of these products. In an example, the diol is selected from 1,4-butanediol, 1,5-pentanediol, 3-methylpentane-1,5-diol, 1,6-hexanediol, neopentyl glycol, and cyclohexane-1,4-dimethanol, trimethylolpropane, glycerol, and pentaerythritol.

Several examples of the composition of the anionic polyurethane polymer are shown in TABLE 1. The following abbreviations are used in TABLE 1: PTMG (Polytetrahydrofuran, MW 1000), PPG (Polypropyleneglycol, MW 1000), Kuraray C-1090 (Polycarbonate Polyol from Kuraray Chemical, MW 1000), MCR-C61 (Monodicarbinol terminated polydimethylsiloxane from Gelest, MW 1000), DMS-C15 (Carbinol (Hydroxyl) terminated polydimethylsiloxane by Gelest, MW 1000), CHDM (cyclohexane dimethyol), MPD (3-Methyl-1,5-Pentanediol from Kuraray), HEA (hydroxylethyl acrylate), YMER N-120 (Polyethyleneoxide Diol from Perstop Chemical), and DMPA (2,2'-Dimethyloyl Propionic Acid).

TABLE 1

| | | | Anionic Polyurethane Polymer Components | | | | |
|---|---|---|---|---|---|---|---|
| ID | (a) isocyanate | (b) Polyol | (c) Ionic Group | (d) N-120 | (e) Diol or Triol | Acid No. | Mol. Weight ($M_w$) |
| PUD-1 | IPDI | PTMG | DMPA | none | none | 55 | High* |
| PUD-2 | IPDI | PTMG | DMPA | none | none | 65 | High |
| PUD-3 | IPDI | Kuraray C-1090 | DMPA | none | none | 55 | High |
| PUD-4 | IPDI | Kuraray C-1090 | DMPA | YMER N-120 | none | 16 | High |
| PUD-5 | IPDI | PPG | DMPA | none | none | 55 | High |
| PUD-6 | IPDI | PTMG | DMPA | none | none | 55 | Med** |
| PUD-10 | IPDI | Kuraray C-1090 | DMPA | YMER N-120 | none | 53 | High |
| PUD-11 | IPDI | Kuraray C-1090 | DMPA | YMER N-120 | none | 53.4 | High |
| PUD-12 | IPDI | Kuraray C-1090 | DMPA | none | none | 55 | Med |
| PUD-13 | IPDI | Kuraray C-1090 | DMPA | YMER N-120 | none | 53.4 | Med |
| PUD-15 | IPDI | PTMG | DMPA | none | none | 72 | High |
| PUD-16 | IPDI | PTMG | DMPA | none | CHDM | 55 | High |
| PUD-21 | IPDI | PTMG | DMPA | none | CHDM/HEA | 55 | High |
| PUD-22 | IPDI | PPG | DMPA/Taurine | none | MPD | 39 | High |
| PUD-23 | IPDI | PPG | DMPA/Taurine | none | MPD | 56 | High |
| PUD-24 | IPDI | PPG | DMPA | none | none | 55 | Med |
| PUD-31 | IPDI | PTMG | Taurine | YMER N-120 | MPD | 16.7 | High |
| PUD-37 | IPDI | PTMG/MCR-C61 | DMPA | none | none | 55 | High |
| PUD-39 | IPDI | PTMG/DMS-C15 | DMPA | none | none | 55 | High |
| PUD-44 | IPDI | PPG | Taurine | none | MPD | 69 | High |

TABLE 1-continued

Anionic Polyurethane Polymer Components

| ID | (a) isocyanate | (b) Polyol | (c) Ionic Group | (d) N-120 | (e) Diol or Triol | Acid No. | Mol. Weight ($M_w$) |
|---|---|---|---|---|---|---|---|
| PUD-53 | IPDI | PPG | DMPA | none | CHDM | 55 | High |

*High = $M_w$ ranging from 25,000 to about 50,000
**Med = $M_w$ ranging from 10,000 to about 25,000

In an example of the first step of the method for making the anionic polyurethane dispersion, components (a), (b), and (c) (with or without components (d) and (e) are mixed in a reactor with the organic solvent (e.g., dibutyl tin dilaulate and acetone). The reactor may be maintained at a constant temperature and under a dry inert gas. The components may be mixed and the polymerization reaction may be allowed to occur for some desirable time to form the polyurethane polymer solution.

In an example of the second step of the method for making the anionic polyurethane polymer, the polyurethane solution may be added to water including a base slowly (e.g., over a 10 minute period) with agitation. The mixture may be stirred and organic solvent may be removed to form the polyurethane dispersion. In an example, the acid number of the polyurethane dispersion ranges from about 15 mg KOH/g solid resin to about 150 mg KOH/g solid resin, or from about 40 mg KOH/g solid resin to about 100 mg KOH/g solid resin.

While the anionic polyurethane dispersion may be added the other components to form the ink composition 14, it is to be understood that the polyurethane polymer itself is present in the ink composition 14 in an amount ranging from about 1 wt % to about 10 wt % of the total wt %. In an example, the polyurethane is present in an amount ranging from about 5 wt % to about 7 wt % of the total ink composition wt %. In yet another example, the polyurethane is present in an amount of about 5 wt % of the total ink composition wt %.

In addition, the ink composition 14 includes the tristyrylphenol ethoxylate. When formulating the ink composition 14, the tristyrylphenol ethoxylate may be added to the pigment dispersion, which is then added to the ink vehicle, or the tristyrylphenol ethoxylate may be added directly to the ink vehicle. An example of the tristyrylphenol ethoxylate structure (I) is shown below:

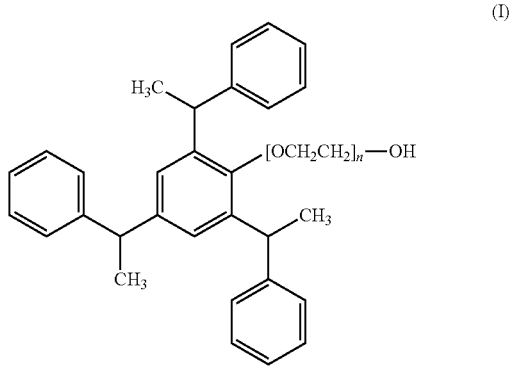

(I)

where n is the number of ($OCH_2CH_2$) molecules ranging from 5 to 25. The tristyrylphenol portion of the molecule (the aromatic structures to the left of the oxygen atom in (I)) is the hydrophobic portion that interfaces with the colorant in the ink composition 14 (or with the ink composition 14' when tristyrylphenol ethoxylate is used in the pre-treatment fixing fluid 12). The ethoxylate portion of the molecule, $-(OCH_2CH_2)_n-OH$ in (I), is the is hydrophilic, water soluble portion of the structure (I). The hydrophilic water soluble portion allows the tristyrylphenol ethoxylate to readily dissolve in the water based ink composition 14.

The tristyrylphenol ethoxylate is present in an amount ranging from about 0.1 wt % to about 2 wt % of the total wt % of the ink composition 14. The tristyrylphenol ethoxylate has a hydrophilic lipophilic balance ("HLB") ranging from about 9 to about 14. Some commercially available examples of suitable tristyrylphenol ethoxylates include SOPROPHOR® BSU (Rhodia) and SOPROPHOR® TS/10 (Rhodia).

The balance of the ink composition 14 is water.

As mentioned above in reference to FIG. 1, some examples of the printing method 10 involve printing another ink composition 14'. It is to be understood that the other ink composition 14' includes at least the pigment and the anionic polymeric dispersant, but may include any of the components previously described for the ink composition 14. In one example, the ink composition 14' includes the components of ink composition 14 except for the tristyrylphenol ethoxylate, and is specifically used in an example of the printing method 10 that utilizes the pre-treatment fixing fluid 12 disclosed herein.

With respect to the pre-treatment fixing fluid 12 shown in FIG. 1, the pre-treatment fixing fluid 12 includes calcium propionate (i.e., CaP), calcium pantothenate (i.e., CaB5), tetraethylene glycol, a low HLB surfactant, an acid, tristyrylphenol ethoxylate, and a balance of water. In some examples, the pre-treatment fixing fluid 12 consists of these components alone, and in other examples, the pre-treatment fixing fluid includes these components and an anti-microbial agent.

The combination of calcium propionate and calcium pantothenate provides the pre-treatment fixing fluid 12 with metal salts that may flocculate anionic pigment in an ink (e.g., ink composition 14 and/or 14') deposited thereon, and that may control pigment migration/flotation, etc. The calcium propionate may be present in an amount ranging from greater than 4.5 wt % to about 8.0 wt % based on the total wt % of the pre-treatment fluid. The calcium pantothenate may be present in an amount ranging from about 2.0 wt % to 15 wt % or less. In an example, the pre-treatment fixing fluid 12 may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid 12 also includes tetraethylene glycol as a co-solvent. The tetraethylene glycol may be present in total in the pre-treatment fixing fluid 12 in a range from about 0.1 wt % to about 30 wt %. The amount used may depend, at least in part, on the jetting architecture used to apply the pre-treatment fixing fluid 12. In an example, the amount of tetraethylene glycol used is about 12 wt %.

The pre-treatment fixing fluid 12 also includes the low HLB surfactant. This type of surfactant is capable of dynamically controlling, in particular, lowering, the surface tension of the pre-treatment fixing fluid 12. The low HLB surfactant is believed to provide the pre-treatment fixing fluid 12, at the time of its application, with a surface tension that is lower than the surface energy of the coated offset medium upon which the pre-treatment fixing fluid 12 is being applied. As such, the pre-treatment fixing fluid 12 spreads out across the medium surface in a horizontal direction (with respect to the medium surface), and effectively wets the offset coated medium.

One example of the low HLB surfactant is a self-emulsifiable wetting agent based on acetylenic diol chemistry (e.g., SURFYNOL® SE-F surfactant from Air Products and Chemicals, Inc.). The low HLB surfactant is present in the pre-treatment fixing fluid 12 in an amount ranging from about 0.01 wt % to about 1.0 wt % based on the total wt % of the pre-treatment fixing fluid 12. In an example, the amount of the surfactant is about 0.05 wt %.

In some examples, the pre-treatment fixing fluid 12 may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCARCIDE™ or KORDEK™ (Dow Chemical Co.), and PROXEL® (Arch Chemicals) series, and combinations thereof. A total amount of the antimicrobial agents in the pre-treatment fixing fluid 12 may range from about 0.05 wt % to about 1 wt %. In an example, the pre-treatment fixing fluid 12 includes about 0.1 wt % of a biocide.

Furthermore, the pre-treatment fixing fluid 12 includes tristyrylphenol ethoxylate. Any of the examples of the tristyrylphenol ethoxylate previously described in reference to the ink composition 14 may be used in the pre-treatment fixing fluid 12. As such, the tristyrylphenol ethoxylate has the same structure and characteristics when incorporated into the pre-treatment fixing fluid 12. The tristyrylphenol ethoxylate is present in an amount ranging from about 0.1 wt % to about 2 wt % of the total wt % of the pre-treatment fixing fluid 12.

The balance of the pre-treatment fixing fluid 12 is water. In addition, a pH adjuster may be used to adjust the pH of the pre-treatment fixing fluid 12 to a particular pH. An example of a suitable pH adjuster is methanesulfonic acid. In some examples, the pH adjuster may be used in an amount sufficient to adjust the pH of the pre-treatment fixing fluid 12 so that it ranges from 4.0 to 7.0. In an example, the pH of the pre-treatment fixing fluid 12 is adjusted to about 6.6 using methanesulfonic acid.

It is to be understood that the pre-treatment fixing fluid 12 excludes any latex polymer.

As mentioned above in reference to FIG. 1, some examples of the printing method 10 involve printing another pre-treatment fixing fluid 12'. It is to be understood that the other pre-treatment fixing fluid 12' includes all of the components of the pre-treatment fixing fluid 12, except for the tristyrylphenol ethoxylate. This example of the pre-treatment fixing fluid 12' may be used in an example of the printing method 10 that utilizes the ink composition 14 disclosed herein.

Returning to the discussion of the printing method 10 shown in FIG. 1, several examples are shown to form an image of the medium 18. It is to be understood that the medium 18 may be a coated offset medium. A coated offset medium is any paper coated to impart better image quality by providing some degree of surface gloss, smoothness, and reduced ink absorbency. Examples of commercially available coated offset media include STERLING® Ultra Gloss (NewPage Corp.) and UTOPIA™ Digital (Appleton Coated LLC).

In a first example of the print method 10, the pre-treatment fixing fluid 12 disclosed herein (including tristyrylphenol ethoxylate) may be applied directly onto the medium 18 using any suitable high speed (e.g., from about 50 fpm to about 1000 fpm) inkjet printing apparatus, including thermal inkjet printers or web presses, piezoelectric inkjet printers or web presses, continuous inkjet printers or web presses. As noted above, the medium 18 may be any type of coated offset medium, such as, for example, Sterling Ultra Gloss media.

When the pre-treatment fixing fluid 12 is utilized in the printing method 10, the amount of pre-treatment fixing fluid 12 that is applied to the medium 18 ranges from about 1 gsm to about 7 gsm.

In this example of the printing method 10, no drying operation is performed after the pre-treatment fixing fluid 12 is applied on the medium 18. Rather, while the pre-treatment fixing fluid 12 is wet, the ink composition(s) 14 and/or 14' is/are deposited on the medium 18 with the pre-treatment fixing fluid 12 thereon. When multiple ink colors are used, it is to be understood that all of the ink(s) 14, 14' is/are applied while previously deposited layers are still wet.

As such, in this example, after the pre-treatment fixing fluid 12 is applied to the medium 18, the ink composition 14 with tristyrylphenol ethoxylate, the ink composition 14' without tristyrylphenol ethoxylate, or both of the ink compositions 14, 14' may be applied to the wet pre-treatment fixing fluid 12 coated on the medium 18. The inks 14, 14' may be applied onto the pre-treatment fixing fluid 12 using the same suitable high speed inkjet printing apparatus disclosed herein for the pre-treatment fixing fluid 12 application. It is to be understood that no drying takes place between the application of the pre-treatment fixing fluid 12 and the ink(s) 14, 14'.

The salts present in the pre-treatment fixing fluid 12 instantaneously react with the anionically dispersed pigment present in the ink(s) 14, 14', causing the pigment to crash out of ink(s) 14, 14' and fixing the pigment on the medium 18 surface. In addition, the tristyrylphenol ethoxylate in the pre-treatment fixing fluid 12 (and in some instances in the ink composition 14) contributes to softening the crashing of the pigment, which improves the wetting of the deposited ink composition(s) 14, 14' on the coated offset medium 18. Improved wetting contributes to better dot gain, which enhances the print quality attributes of at least optical density and gloss. The benefits of tristyrylphenol ethoxylate are in addition to the benefits obtained from the instantaneous fixing of the anionically dispersed pigment(s) in the ink(s) 14, 14' by the salts in the pre-treatment fixing fluid 12.

After applying the pre-treatment fixing fluid 12 and ink(s) 14, 14' onto the medium 18, a drying operation 16 may be performed. The drying operation(s) 16 may be performed at ambient temperature or under heat using a heating device (e.g., heat lamp, oven, etc.). For example, the drying operation 16 may be performed at about 80° C., or in some examples, at about 100° C., or in still further examples, at 80° C. and then at 100° C.

If the ink(s) 14, 14' is/are a UV ink, the ink(s) 14, 14' may be exposed to curing 17 after the drying operation is performed. Any suitable source of UV radiation may be used to initiate curing 17, such as, for example, UV lamps or plasma torches or lasers operating in the UV range. The actual wavelength (within the UV range of 280 nm to 400 nm) and intensity of the ultraviolet radiation used may vary, depending at least in part, upon the curable polymer components (e.g., the polyurethane) included in the ink(s) 14, 14'.

In a second example of the printing method 10, no pre-treatment fixing fluid 12 of 12' is used. The ink composition 14 that includes tristyrylphenol ethoxylate is printed directly onto the medium 18 using the same suitable high speed inkjet printing apparatus previously described. The medium 18 may be any type of coated offset medium, such as, for example, Sterling Ultra Gloss media.

After the ink composition 14 is printed onto the medium 18, the same drying operation(s) 16 as previously described herein in reference to the first example of the printing method 10 may be used to dry the ink composition 14 on the medium 18. In addition, if the ink 14 is a UV ink, the ink composition 14 may also be subjected to the curing operation 17 by the same process previously disclosed herein in reference to the first example of the printing method 10.

In a third example of the printing method 10, a pre-treatment fixing fluid 12' without tristyrylphenol ethoxylate is used in combination with the ink composition 14 that includes tristyrylphenol ethoxylate. The pre-treatment fixing fluid 12' may be applied directly onto the medium 18 using any suitable high speed inkjet printing apparatus, and while the pre-treatment fixing fluid 12' is still wet, the ink composition 14 including the tristyrylphenol ethoxylate may be applied thereon.

The drying operation 16, or a drying operation 16 followed by the curing operation 17 may be performed as previously described.

In this example, the salts present in the pre-treatment fixing fluid 12' instantaneously react with the anionically dispersed pigment present in the ink(s) 14, causing the pigment to crash out of ink(s) 14 and fixing the pigment on the medium 18 surface. In addition, the tristyrylphenol ethoxylate in the ink composition 14 contributes to softening the crashing of the pigment, which improves the wetting of the deposited ink composition(s) 14 on the coated offset medium 18.

To further illustrate the present disclosure, examples are given herein. It is to be understood that these examples are provided for illustrative purposes and are not to be construed as limiting the scope of the present disclosure.

EXAMPLES

Example 1

In this example, thirteen different pre-treatment fixing fluids were prepared with and without tristyrylphenol ethoxylate. Seven of the pre-treatment fixing fluids were formulated with calcium propionate alone as the salt, and these formulations are shown in TABLE 2. Six of the pre-treatment fixing fluids were formulated with calcium propionate and calcium pantothenate (CaB5) as the salts, and these formulations are shown in TABLE 3.

A control ink formulation (control ink 1) was prepared by adding a styrene acrylate black (K) pigment dispersion and a polyurethane dispersion (PUD) to the remaining ink components (surfactants, water, etc.) that are shown in TABLE 4.

TABLE 2

| Pre-Treatment Fixing Fluids With CaP Alone | | | | | | | |
|---|---|---|---|---|---|---|---|
| Pre-Treatment Fixing Fluid Components | PTFF A | PTFF B | PTFF C | PTFF D | PTFF E | PTFF F | PTFF G |
| Calcium Propionate | 6.5 | 6.5 | 6.5 | 6.5 | 6.5 | 6.5 | 6.5 |
| Calcium Pantothenate | 0 | 0 | 0 | 0 | 0 | 0 | 0 |
| SURFYNOL ® SE-F | 0.05 | 0.05 | 0.05 | 0.05 | 0.05 | 0.05 | 0.05 |
| Tetraethylene Glycol | 12.0 | 12.0 | 12.0 | 12.0 | 12.0 | 12.0 | 12.0 |
| Methanesulfonic Acid | Added to adjust pH to 6.6 | Added to adjust pH to 6.6 | Added to adjust pH to 6.6 | Added to adjust pH to 6.6 | Added to adjust pH to 6.6 | Added to adjust pH to 6.6 | Added to adjust pH to 6.6 |
| PROXEL ® GXL | 0.1 | 0.1 | 0.1 | 0.1 | 0.1 | 0.1 | 0.1 |
| SOPROPHOR ® BSU (TSP-EO, HLB~12.6) | 0 | 0 | 0 | 1.0 | 1.5 | 2.0 | 0 |
| SOPROPHOR ® TS/10 (TSP-EO, HLB~10.4) | 1.0 | 1.5 | 2.0 | 0 | 0 | 0 | 0 |
| Water | Bal. | Bal. | Bal. | Bal. | Bal. | Bal. | Bal. |

TABLE 3

| Pre-Treatment Fixing Fluids With CaP and CaB5 | | | | | | |
|---|---|---|---|---|---|---|
| Pre-Treatment Fixing Fluid Components | PTFF H | PTFF I | PTFF J | PTFF K | PTFF L | PTFF M |
| Calcium Propionate | 6.5 | 6.5 | 6.5 | 6.5 | 6.5 | 6.5 |
| Calcium Pantothenate | 4.8 | 4.8 | 4.8 | 4.8 | 4.8 | 4.8 |
| SURFYNOL ® SE-F | 0.05 | 0.05 | 0.05 | 0.05 | 0.05 | 0.05 |
| Tetraethylene Glycol | 12.0 | 12.0 | 12.0 | 12.0 | 12.0 | 12.0 |

TABLE 3-continued

| Pre-Treatment Fixing Fluids With CaP and CaB5 | | | | | | |
|---|---|---|---|---|---|---|
| Methanesulfonic Acid | Added to adjust pH to 6.6 | Added to adjust pH to 6.6 | Added to adjust pH to 6.6 | Added to adjust pH to 6.6 | Added to adjust pH to 6.6 | Added to adjust pH to 6.6 |
| PROXEL ® GXL | 0.1 | 0.1 | 0.1 | 0.1 | 0.1 | 0.1 |
| SOPROPHOR ® BSU (TSP-EO, HLB~12.6) | 0 | 0 | 0 | 1.0 | 1.5 | 0 |
| SOPROPHOR ® TS/10 (TSP-EO, HLB~10.4) | 1.0 | 1.5 | 2.0 | 0 | 0 | 0 |
| Water | Bal. | Bal. | Bal. | Bal. | Bal. | Bal. |

TABLE 4

Control Ink 1 Composition

| Ink Component | Control Ink 1 |
|---|---|
| PUD | 5.00 |
| 1-(2-hydroxyethyl)-2-pyrrolidone | 10.00 |
| CRODAFOS N-3 ® acid | 0.75 |
| SURFYNOL ® SE-F | 0.40 |
| TEGO ® Wet 510 | 0.40 |
| LEG-1 | 1.00 |
| IRGACURE ® 819 | 0.25 |
| styrene acrylate K pigment dispersion | 2.75 |
| water | Bal. |

The pre-treatment fixing fluids were respectively applied at an amount of about 2.5 gsm (g/m²) onto Sterling Ultra Gloss media. More particularly, the pre-treatment fixing fluids were applied using a testbed and a 9 ng pen.

While the respective pre-treatment fixing fluids were wet, control ink 1, the formulation of which is shown in TABLE 4, was printed on each of the pre-treated media using the testbed at 2 dpp and 3 dpp with a 9 ng pen. After the application of control ink 1 to the different pre-treated media, the respective prints were dried with a heating device at about 190° C. for about 5 seconds. Once the respective prints were dry, they were cured by exposing the inks to a light-emitting diode ("LED") ultraviolet lamp source for about 0.04 seconds.

After the prints were dried and cured, optical density (OD) measurements and 60° gloss measurements were taken of each print. Multiple optical density and 60° gloss measurements were taken for each example of the prints and the results were averaged. OD was measured using an X-rite 500 series Spectrodensitometer. 60° gloss (the amount of light reflected at 60°) was measured using a Micro Tri-Gloss 4000 series gloss meter by BYK Gardner. These results are shown in FIG. 2.

Figure 2:
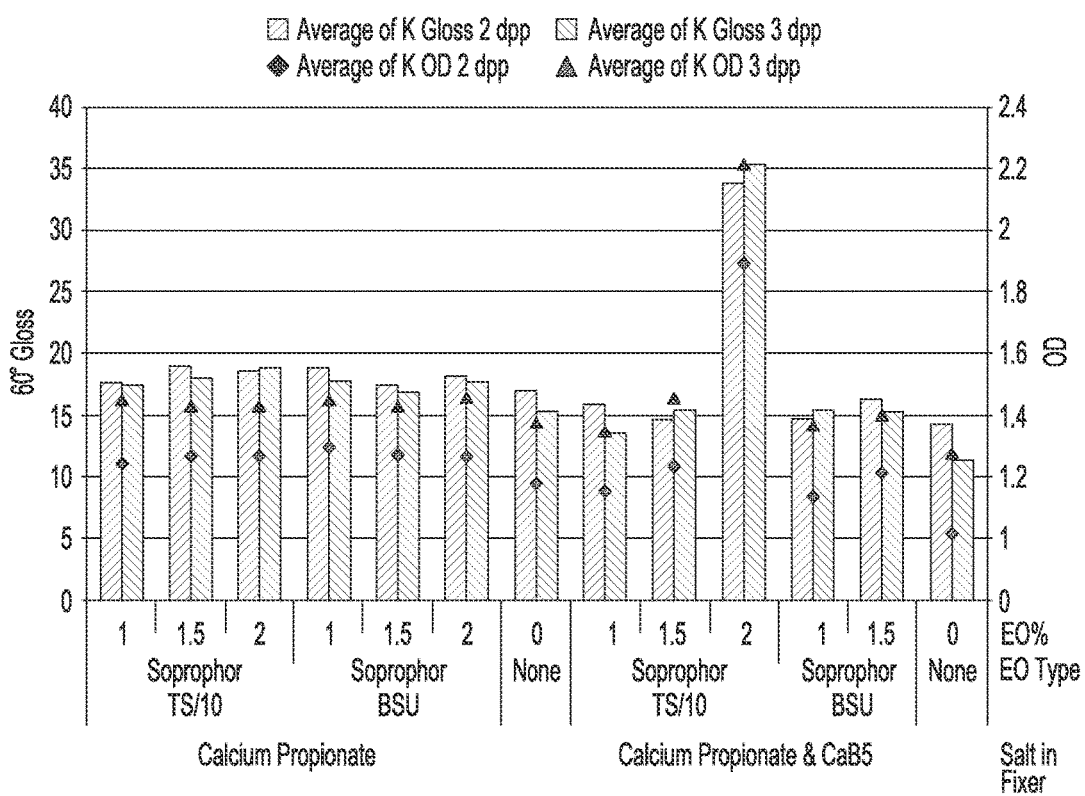
FIG. 2 is a bar graph depicting gloss and optical density measurements of an ink applied to coated offset media having thereon 2.5 gsm of different examples of the pre-treatment fixing fluids.

In FIG. 2, the optical density values are along the right Y axis and the 60° gloss values are along the left Y axis. The X axis illustrates i) the salt in the fixer (row labeled "salt in fixer"), ii) the type of tristyrylphenol ethoxylate (i.e., none or SOPROPHOR® TS/10 or SOPROPHOR® BSU) used in the pre-treatment fixing fluid (row labeled "EO Type"), and iii) the amount of tristyrylphenol ethoxylate present in the pre-treatment fixing fluid used (row labeled "EO %"). The results for prints formed using the control ink and PTFFA through PTFF M are shown left to right in the graph, respectively.

As illustrated in FIG. 2, there was a black optical density improvement of 0.2 and above with the addition of either tristyrylphenol ethoxylate at 2 dpp. There was also generally black optical density improvement with the addition of either tristyrylphenol ethoxylate at 3 dpp as well. In general, for the pre-treatment fixing fluids with both salts and one of the tristyrylphenol ethoxylates (i.e., PTFF H through PTFF L), both gloss and optical density were improved compared to the example where control ink 1 (with no tristyrylphenol ethoxylate) was printed on pre-treatment fixing fluid with no tristyrylphenol ethoxylate (PTFF M, far right results in FIG. 2).

As illustrated in FIG. 2, with the control ink 1, the most effective pre-treatment fixing fluid was PTFF J, which included SOPROPHOR® TS/10 at 2 wt % with both salts.

Example 2

In this example, several ink compositions were prepared by incorporating varying amounts of tristyrylphenol ethoxylate (TSP-EO), specifically, SOPROPHOR® BSU, into an ink formulation. The ink formulations were prepared by adding a styrene acrylate black (K) pigment dispersion to the remaining ink components (surfactants, H—₂O) as shown in TABLE 5 and TABLE 6. Some inks included no polyurethane dispersion, and the remainder of the formulations included different types of polyurethane dispersions. In this example, PUD #1 was a commercially available polyurethane dispersion, namely LUX® 260 (manufactured by Alberdingk Boley). The PUD #2 and the PUD #3 were different polyurethane dispersions prepared as previously described herein (e.g., anionic polyurethane polymers including a polyisocyanate segment; a polyol segment having a number average molecular weight ranging from about 500 to about 6,000; and a compound including i) an ionic group or ii) a group to form an ionic group).

The final ink composition formulations are shown in TABLE 5 and TABLE 6. It is to be understood that the amounts are in weight percent. The weight percentages of the styrene acrylate black pigment dispersion and the polyurethane dispersion represent, respectively, the total pigment solids and the total polyurethane solids present in the final formulations.

TABLE 5

| Ink Component | Control Ink 2 | Ink 3 | Ink 4 | Control Ink 5 | Ink 6 | Ink 7 |
|---|---|---|---|---|---|---|
| PUD #1 | 0 | 0 | 0 | 5.00 | 5.00 | 5.00 |
| PUD #2 | 0 | 0 | 0 | 0 | 0 | 0 |
| PUD #3 | 0 | 0 | 0 | 0 | 0 | 0 |
| 1-(2-hydroxyethyl)-2-pyrrolidone | 10.00 | 10.00 | 10.00 | 10.00 | 10.00 | 10.00 |
| CRODAFOS N-3 ® acid | 0.75 | 0.75 | 0.75 | 0.75 | 0.75 | 0.75 |

TABLE 5-continued

| Ink Component | Control Ink 2 | Ink 3 | Ink 4 | Control Ink 5 | Ink 6 | Ink 7 |
|---|---|---|---|---|---|---|
| SURFYNOL ® SE-F | 0.40 | 0.40 | 0.40 | 0.40 | 0.40 | 0.40 |
| TEGO ® Wet 510 | 0.40 | 0.40 | 0.40 | 0.40 | 0.40 | 0.40 |
| LEG-1 | 1.00 | 1.00 | 1.00 | 1.00 | 1.00 | 1.00 |
| styrene acrylate K pigment dispersion | 2.75 | 2.75 | 2.75 | 2.75 | 2.75 | 2.75 |
| SOPROPHOR ® BSU (TSP-EO, HLB~12.6) | 0 | 0.25 | 1.50 | 0 | 0.25 | 1.50 |
| Water | Bal. | Bal. | Bal. | Bal. | Bal. | Bal. |

TABLE 6

| Ink Component | Control Ink 8 | Ink 9 | Ink 10 | Control Ink 11 | Ink 12 | Ink 13 |
|---|---|---|---|---|---|---|
| PUD #1 | 0 | 0 | 0 | 0 | 0 | 0 |
| PUD #2 | 5.00 | 5.00 | 5.00 | 0 | 0 | 0 |
| PUD #3 | 0 | 0 | 0 | 5.00 | 5.00 | 5.00 |
| 1-(2-hydroxyethyl)-2-pyrrolidone | 10.00 | 10.00 | 10.00 | 10.00 | 10.00 | 10.00 |
| CRODAFOS N-3 ® acid | 0.75 | 0.75 | 0.75 | 0.75 | 0.75 | 0.75 |
| SURFYNOL ® SE-F | 0.40 | 0.40 | 0.40 | 0.40 | 0.40 | 0.40 |
| TEGO ® Wet 510 | 0.40 | 0.40 | 0.40 | 0.40 | 0.40 | 0.40 |
| LEG-1 | 1.00 | 1.00 | 1.00 | 1.00 | 1.00 | 1.00 |
| styrene acrylate K pigment dispersion | 2.75 | 2.75 | 2.75 | 2.75 | 2.75 | 2.75 |
| SOPROPHOR ® BSU (TSP-EO, HLB~12.6) | 0 | 0.25 | 1.50 | 0 | 0.25 | 1.50 |
| Water | Bal. | Bal. | Bal. | Bal. | Bal. | Bal. |

In addition, the pre-treatment fixing fluid of the formulation PTFFM (TABLE 3) was prepared and applied at an amount of about 2.5 gsm onto Sterling Ultra Gloss media as previously disclosed herein in reference to Example 1.

While the respective pre-treatment fixing fluids were wet, the inks of TABLE 5 and TABLE 6 were printed on each of the pre-treated media using the method previously disclosed herein in reference to Example 1. The inks were printed onto the media starting at 4% ink density up to 100% ink density (which corresponds to 3 drops per pixel of ink flux). After a certain ink percentage was applied to the medium, the ink was dried and cured. Optical density measurements were taken at each percentage point.

Figure 3A:
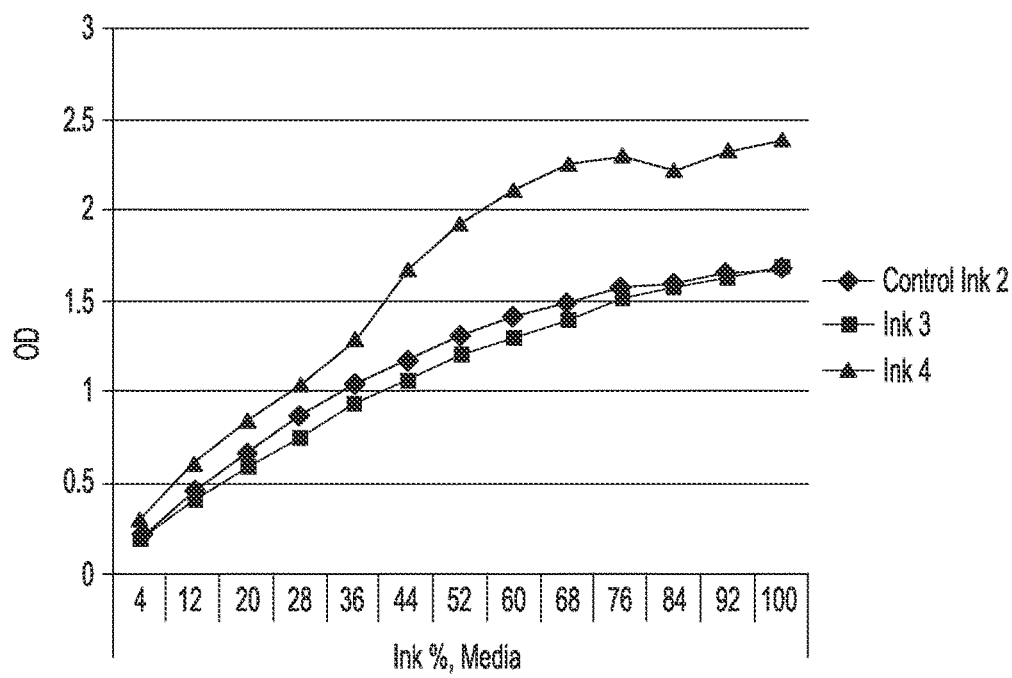
FIGS. 3A-3D are graphs depicting optical density of examples of the ink disclosed herein and comparative control inks including no polyurethane dispersion or different types of polyurethane dispersions versus the percentage of ink or comparative control ink applied to a coated offset media.
Figure 3B:
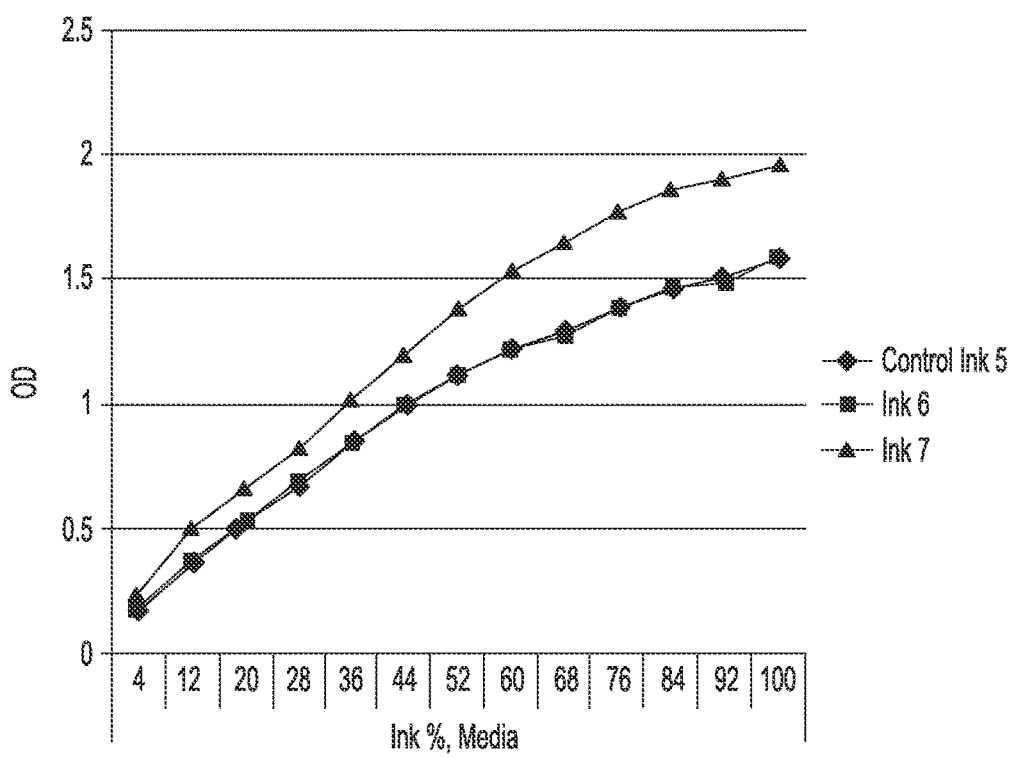
Figure 3C:
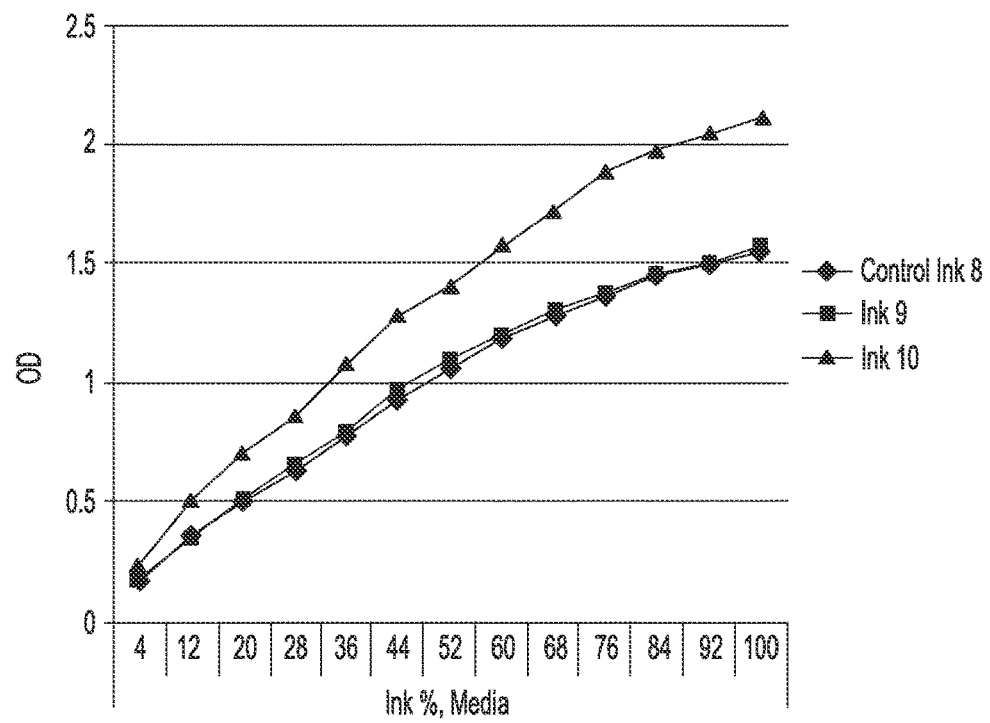
Figure 3D:
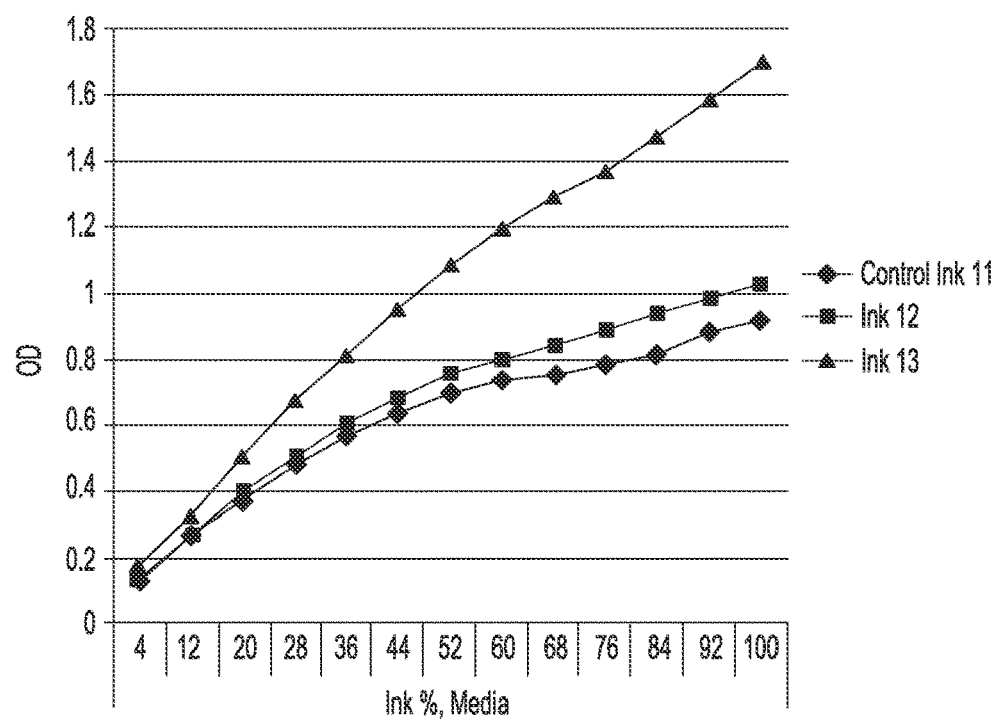

The results in FIGS. 3A-3D illustrate that optical density may be improved in the inks disclosed herein including tristyrylphenol ethoxylate (TSP-EO) and any type of polyurethane dispersion or no polyurethane dispersion. In particular, the optical density results for ink 4, and ink 3 at 100% in FIG. 3A show that an increase in the optical density may be achieved without a polyurethane dispersion in the ink composition. Inks 5-13 used different types of polyurethane dispersions, and the inks including 1.5% tristyrylphenol ethoxylate (TSP-EO) (inks 7, 10, and 13) showed a large increase in optical density compared to the respective control inks 5, 8, and 11 (see FIGS. 3B-3D). The inks including 0.25% tristyrylphenol ethoxylate (TSP-EO) (inks 6, 9, and 12) showed a slight increase in optical density compared to the respective control inks 5, 8, and 11 at least at some of the ink percentages (FIG. 3B, 44%, 84%, FIG. 3C at 28% and above, FIG. 3D at 20% and above). In general in FIGS. 3A-3D, the inks had a higher optical density when an increased amount of tristyrylphenol ethoxylate was used.

It is to be understood that the ranges provided herein include the stated range and any value or sub-range within the stated range. For example, a range from about 1 wt % to about 10 wt % should be interpreted to include not only the explicitly recited limits of about 1 wt % to about 10 wt %, but also to include individual values, such as 1.5 wt %, 5.5 wt %, 7 wt %, 9 wt %, etc., and sub-ranges, such as from about 1 wt % to about 8 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent that the disclosed examples may be modified. Therefore, the foregoing description is to be considered non-limiting.

What is claimed is:

1. An inkjet ink composition, comprising:
   a pigment;
   an anionic polymeric dispersant;
   a co-solvent;
   a surfactant present in an amount ranging from about 0.01 wt % to about 5 wt % based on the total wt % of the inkjet ink composition;
   tristyrylphenol ethoxylate present in an amount ranging from about 0.1 wt % to about 2 wt % of a total wt % of the inkjet ink composition; and
   a balance of water.

2. The inkjet ink composition as defined in claim 1, excluding a latex polymer.

3. The inkjet ink composition as defined in claim 1 wherein the inkjet ink composition further includes polyurethane.

4. The inkjet ink composition as defined in claim 3 wherein the inkjet ink composition is an ultraviolet (UV) curable ink composition.

5. The inkjet ink composition as defined in claim 3 wherein the polyurethane is an anionic polyurethane polymer including:
   a polyisocyanate segment;
   a polyol segment having a number average molecular weight ranging from about 500 to about 6,000; and
   a compound including i) an ionic group or ii) a group to form an ionic group.

6. A pre-treatment fixing fluid for an offset coated medium, comprising:
   calcium propionate present in an amount ranging from greater than 4.5 wt % to 8.0 wt % based on a total wt % of the pre-treatment fixing fluid;
   calcium pantothenate present in an amount ranging from about 2.0 wt % to equal to or less than 15 wt % based on the total wt % of the pre-treatment fixing fluid;
   a co-solvent;
   a surfactant present in an amount ranging from about 0.01 wt % to about 1 wt % based on a total wt % of the pre-treatment fixing fluid;
   tristyrylphenol ethoxylate present in an amount ranging from about 0.1 wt % to about 2 wt % of a total wt % of the pre-treatment fixing fluid; and
   a balance of water.

7. The pre-treatment fixing fluid as defined in claim 6 wherein the co-solvent is tetraethylene glycol.

8. The pre-treatment fixing fluid as defined in claim 6 wherein the surfactant has a hydrophilic lipophilic balance (HLB) less than 10 and is present in an amount ranging from about 0.01 wt % to about 1.0 wt % based on the total wt % of the pre-treatment fixing fluid.

9. The pre-treatment fixing fluid as defined in claim 6, further comprising an acid present in an amount sufficient to render a pH of the pre-treatment fixing fluid from about 4.0 to about 7.0.

10. The pre-treatment fixing fluid as defined in claim 6, excluding a latex polymer.

11. A method for improving print quality of an image formed on a coated offset medium, the method comprising any of:
    i) printing an inkjet ink composition directly on a surface of the coated offset medium, the inkjet ink composition including:
        a pigment;
        an anionic polymeric dispersant;
        a co-solvent;
        a surfactant present in an amount ranging from about 0.01 wt % to about 5 wt % based on the total wt % of the inkjet ink composition;
        tristyrylphenol ethoxylate present in an amount ranging from about 0.1 wt % to about 2 wt % of a total wt % of the inkjet ink composition; and
        a balance of water; or
    ii) printing a pre-treatment fixing fluid directly onto a surface of the coated offset medium, the pre-treatment fixing fluid including:
        calcium propionate present in an amount ranging from greater than 4.5 wt % to 8.0 wt % based on a total wt % of the pre-treatment fixing fluid;
        calcium pantothenate present in an amount ranging from about 2.0 wt % to equal to or less than 15 wt % based on the total wt % of the pre-treatment fixing fluid;
        a co-solvent;
        a surfactant present in an amount ranging from about 0.01 wt % to about 1 wt % based on a total wt % of the pre-treatment fixing fluid;
        tristyrylphenol ethoxylate present in an amount ranging from about 0.1 wt % to about 2 wt % of a total wt % of the pre-treatment fixing fluid; and
        a balance of water; and
    then printing an ink composition on the pre-treatment fixing fluid.

12. The method as defined in claim 11 wherein the method includes ii), and wherein the ink composition that is printed on the pre-treatment fixing fluid includes:
    a pigment;
    an anionic polymeric dispersant;
    a co-solvent;
    a surfactant;
    tristyrylphenol ethoxylate present in an amount ranging from about 0.1 wt % to about 2 wt % of a total wt % of the ink composition; and
    a balance of water.

13. The method as defined in claim 12 wherein the ink composition further includes polyurethane, and wherein the method further comprises curing the printed ink composition.

14. The method as defined in claim 11 wherein the method includes i), wherein the inkjet ink composition further includes polyurethane, and wherein the method further comprises curing the printed inkjet ink composition.

15. The method as defined in claim 11 wherein the method includes ii) and wherein the method further comprises performing a drying operation after the pre-treatment fixing fluid and the ink composition are printed on the coated offset medium, and wherein no drying operation is performed between the printing of the pre-treatment fixing fluid and the printing of the ink composition.

16. The inkjet ink composition as defined in claim 1 wherein the tristyrylphenol ethoxylate has a hydrophilic lipophilic balance (HLB) ranging from about 9 to about 14.

17. The inkjet ink composition as defined in claim 1 wherein the tristyrylphenol ethoxylate has the structure (I):

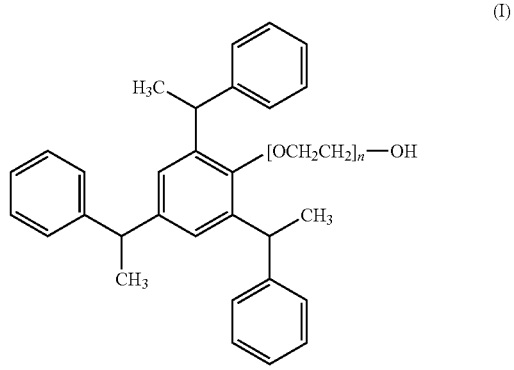

wherein n ranges from 5 to 7.

18. The pre-treatment fixing fluid as defined in claim 6 wherein the tristyrylphenol ethoxylate has a hydrophilic lipophilic balance (HLB) ranging from about 9 to about 14.

19. The pre-treatment fixing fluid as defined in claim 6 wherein the tristyrylphenol ethoxylate has the structure (I):

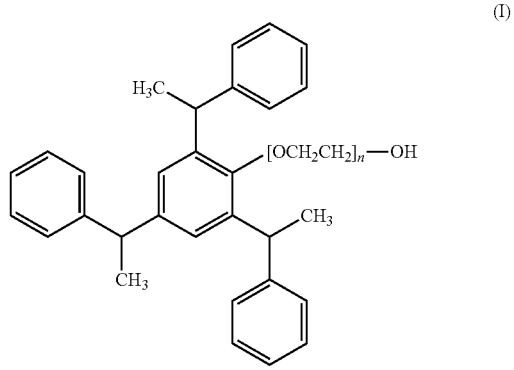

wherein n ranges from 5 to 7.

* * * * *